No. 760,128. PATENTED MAY 17, 1904.
R. A. JACKSON.
PIPE CUTTER.
APPLICATION FILED DEC. 7, 1903.
NO MODEL. 2 SHEETS—SHEET 1.
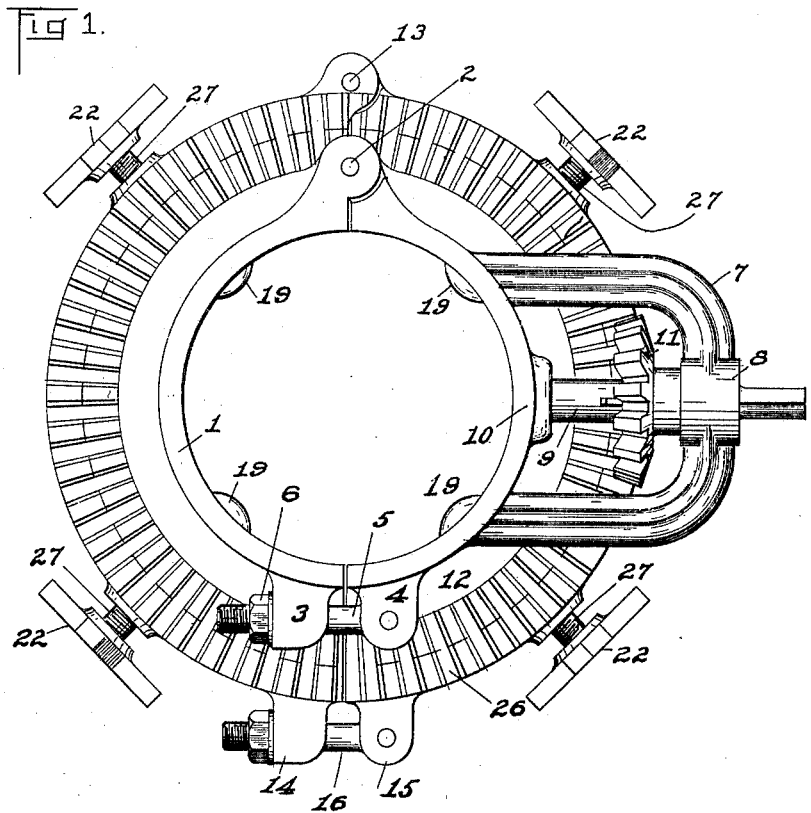
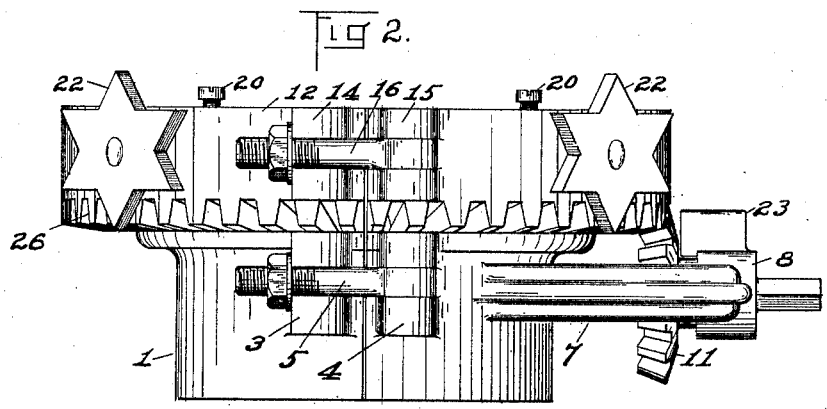
WITNESSES:
James M. Sawyer
Mae Hofmann
INVENTOR
Robert A. Jackson
BY
Thos. Trousdale
ATTORNEY.

No. 760,128. PATENTED MAY 17, 1904.
R. A. JACKSON.
PIPE CUTTER.
APPLICATION FILED DEC. 7, 1903.
NO MODEL. 2 SHEETS—SHEET 2.
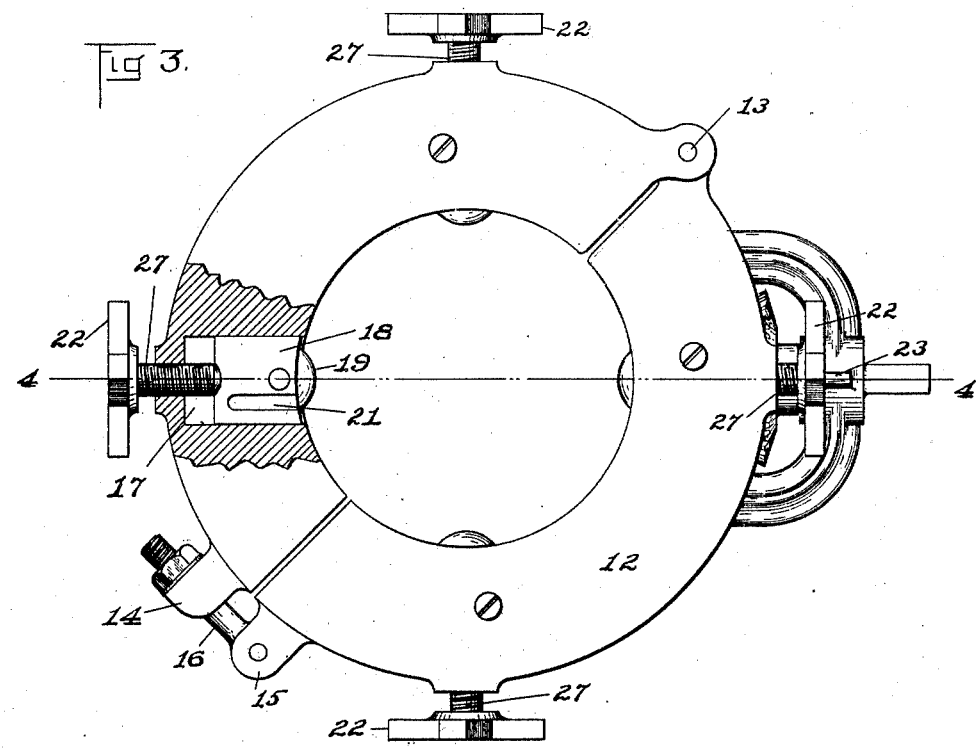
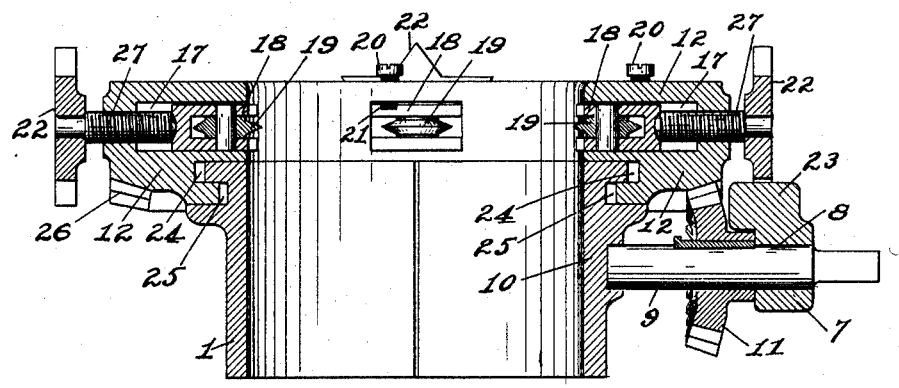
WITNESSES:
James M. Sawyer
Mae Hofmann
INVENTOR
Robert A. Jackson
BY
Jno. Ewardale
ATTORNEY.

No. 760,128. Patented May 17, 1904.

UNITED STATES PATENT OFFICE.

ROBERT A. JACKSON, OF NORRISTOWN, PENNSYLVANIA.

PIPE-CUTTER.

SPECIFICATION forming part of Letters Patent No. 760,128, dated May 17, 1904.

Application filed December 7, 1903. Serial No. 184,007. (No model.)

*To all whom it may concern:*

Be it known that I, ROBERT A. JACKSON, a citizen of the United States, residing at Norristown, in the county of Montgomery and State of Pennsylvania, have invented a new and useful Pipe-Cutter, of which the following is a specification.

My invention relates to improvements in pipe-cutters, my object being to afford improved simple and efficient means for cutting iron bars, tubes, or pipes whether the same be absolutely true and symmetrical or not, said means being adapted to occupy and be operated in a minimum amount of space.

My device is especially adapted to be employed in cutting pipe located in a ditch or excavation where very little room is permitted for securing the cutting device in place and for operating the same, and, further, my device is so constructed that it may be secured in operative position about the pipe and operated to cut said pipe from any side or direction required or made necessary by the peculiar shape of the excavation in which operation must take place or in view of said branches, joints, or other obstacles approximate thereto.

Referring to the drawings, Figure 1 is a front elevation of my device. Fig. 2 is a side elevation of same. Fig. 3 is an elevation of my device opposite that shown in Fig. 1. Fig. 4 is a cross-section on line 4 4 of Fig. 3.

Similar numerals refer to similar parts throughout the several views.

Referring to the drawings, the ring or yoke member 1 is split diametrically and pivotally hinged at 2 and provided with lugs 3 and 4. To one lug 4 is pivoted the eyebolt 5, which is threaded at its free end and adapted to drop into a slot in slug 3, whereby the nut 6, operating upon the threaded end of eyebolt 5, engages with the lug 3 to clamp the two sections of the ring or yoke 1. By this arrangement it must be clear that the yoke 1 may be firmly clamped to a pipe or bar of slightly greater diameter, thereby dispensing with the set-screw means of engagement commonly used in the prior art.

By loosening the nut 6 it is obvious that the eyebolt 5 may be swung out of the slot in lug 3, and consequently out of engagement with lug 3, thereby permitting the opening of the ring or yoke 1 to permit the removal of the same.

To one member of the ring or yoke 1 is cast or otherwise provided the extension-yoke 7, which has a bearing at 8 for the shaft 9. A step-bearing for the other end of this shaft is provided at 10. Upon shaft 9 and rotatable therewith is mounted the pinion 11.

The shaft 9 may be rotated by a ratchet or other suitable means.

The pinion 11 is secured by a feather against rotation independently of the shaft, but so as to permit longitudinal movement of said pinion on said shaft for the purpose hereinafter to be described.

Rotatably secured to the yoke member 1 is the carrier member 12, which is channeled and flanged. This member 12 is also of split construction similar to that of the ring or yoke member 1, being hinged at 13 and having lugs 14 and 15 and eyebolt 16 for securing its free ends.

The carrier member 12 is provided with four apertures 17, extending from the inner circumference of member 12 part way toward the outer circumference. In these apertures are slidably seated the bearing-boxes 18, provided with the cutter-rollers 19. The outward movement of the bearing-boxes 19 is limited by the screws 20, projecting into slots 21. It is obvious that by withdrawing the screws 20 from said slots 21 the bearing-boxes may be readily removed from the carrier 12. These cutter-rollers 19 are fed down automatically, as follows: Star-wheels 22 are provided, which as they are carried around by the carrier member 12 strike with one of their points the lug 23 on member 7, causing a partial revolution of said star-wheels. These star-wheels are mounted on screws 27, which impinge the rear of the bearing-boxes 18, and thus cause a forward movement of said bearing-boxes with each rotative movement of said star-wheels, thus feeding the cutter-rollers 19 into the pipe or bar to be cut as the carrier member 12 is rotated.

From an inspection of Fig. 4 it will be observed that spaces 24 and 25 are provided between the yoke member 1 and carrier member 12. In view of these spaces and the construction of the flange and channel engagement of members 1 and 12 (shown in Fig. 4) it is obvious that no independent axial movement is permitted between said members 1 and 12; but there is permitted a limited independent radial movement between said members 1 and 12.

Upon the face of the carrier member 12 which is toward the yoke member 1 is provided the gear 26, which is adapted to mesh with the pinion 11, so that the rotating of pinion 11 will cause the rotative movement of the carrier member 12. As above described, the pinion 11 has a limited longitudinal movement on shaft 9 for the purpose of permitting it to accommodate itself to the transverse movement of carrier member 12 with respect to yoke member 1, just decribed. The purpose of providing for this independent transverse movement between members 1 and 12 is to permit the member 12 to accommodate itself to unevenness existing in the pipe or bar operated upon after the yoke member 1 has been rigidly clamped thereon.

It is obvious that the split construction of the yoke member and the carrier member enables the device to be opened up and clamped upon the pipe to be cut in a very limited space, and from the fact that the yoke member may be clamped upon the pipe so as to bring the shaft 9 projecting from any side thereof that may be desired it is obvious that the device may be placed upon the pipe in a position most convenient for operation and so as to require the minimum amount of space thereabout.

The construction above described and illustrated in the drawings of the bearing-boxes 18 and cutter-rollers 19 are of the simplest and most substantial character and such as may be readily removed from the carrier member 12. It will also be seen that from the construction above shown and described when the carrier member 12 is rotated in one direction the screws 27 will be moved by the star-wheels 22 to drive the cutter-rollers 19 into the material to be cut; but upon the rotation of the carrier member 12 in the opposite direction the screws 27 will be withdrawn from the bearing-boxes 18, thus permitting the cutter-rollers 19 to withdraw from the material operated upon.

What I claim is—

1. In a cutting device, the combination of a hinged yoke member and a hinged carrier member having tongue-and-flange engagement with each other, said engagement being such as to prevent independent axial movement and permit independent radial movement therebetween.

2. In a cutting device, the combination of a hinged yoke or clamping member and a hinged carrier member rotatably secured thereto, the engagement between the clamping member and the carrier member being such as to prevent independent axial movement and to permit independent radial movement therebetween.

3. In a cutting device, the combination of a yoke or clamping member adapted to be clamped to the device to be operated upon, a cutter-carrying member, channel-and-flange means for detachably securing the carrying member to the yoke member so that the former may rotate about the latter, a gear provided on said carrying member, a pinion for coöperating therewith, and a shaft for said pinion supported by said yoke member, said pinion having an axial movement on its supporting-shaft to correspond with the independent radial movement between the yoke and carrying members.

4. In a cutting device, the combination of a yoke or clamping member adapted to be clamped to the device to be operated upon, a cutter-carrying member, channel-and-flange means for detachably securing the carrying member to the yoke member so that the former may rotate about the latter and so as to permit radial movement therebetween, a gear provided on said carrying member, a pinion for coöperating therewith, and a shaft for said pinion supported by said yoke member, said pinion having an axial movement on its supporting-shaft to correspond with the independent radial movement between the yoke and carrying members.

5. In a cutting device, the combination of a split-ring yoke or clamping member adapted to be clamped to the object to be operated upon, a split-ring cutter-carrying member, channel-and-flange means for detachably securing the carrying member to the yoke member so that the former may rotate about the latter and so as to permit radial movement therebetween, and gear-and-pinion means operating between the yoke member and the carrying member for causing the rotation of the latter.

6. In a cutting device, the combination of a clamping member adapted to be clamped to the object to be operated upon, a cutter-carrying member having channel-and-flange engagement with the clamping member, said engagement being such as to permit of independent radial movement between said two members, radially-movable cutter-rollers seated in said carrying member, means for rotating said carrying member and automatic means for moving the cutter-rollers as the carrier member is rotated.

7. In a cutting device, the combination of a clamping member adapted to be clamped to the object to be operated upon, a cutter-carrying member having channel-and-flange engagement with the clamping member, having independent radial movement and rotatable thereon, and provided with radially-disposed recesses opening into its inner periphery, cutter-rollers and bearing-boxes for the same slidably seated in said recesses.

8. In a cutting device, the combination of a clamping member adapted to be clamped to the object to be operated upon, a cutter-carrying member having channel-and-flange engagement with the clamping member, having independent radial movement and rotatable thereon and provided with radially-disposed recesses opening into its inner periphery, cutter-rollers and bearing-boxes for the same slidably seated in said recesses, and automatic means for feeding said cutter-rollers into the material operated upon as the carrier member is rotated.

9. In a cutting device, the combination of a clamping member, a cutter-carrying member rotatably secured thereto provided with a gear, and a pinion adapted to coöperate with said gear supported by the clamping member, the engagement between the clamping member and the carrying member being such as to prevent independent axial movement and to permit independent radial movement between said two members.

10. In a cutting device, the combination of a clamping member, a cutter-carrying member having rotative engagement therewith, said engagement being such as to prevent independent axial movement and permit independent radial movement between said two members, cutter-rollers slidably mounted in said carrying member, a gear provided on said carrying member and a pinion for coöperating therewith supported by the clamping member and automatic means for feeding the cutter-rollers into the material as the carrier member is rotated.

11. In a cutting device, the combination of a clamping member, a cutter-carrying member having rotative engagement therewith, said engagement being such as to prevent independent axial movement and permit independent radial movement between said two members, cutter-rollers slidably mounted in said carrying member, disengageable means for limiting the sliding movement of said cutter-rollers, a gear provided on said carrying member and a pinion for coöperating therewith, supported by the clamping member and automatic means for feeding the cutter-rollers into the material as the carrier member is rotated.

12. In a cutting device, the combination of a clamping member, a cutter-carrying member having rotative engagement therewith, said engagement being such as to prevent independent axial movement and permit independent radial movement between said two members, cutter-rollers slidably mounted in said carrying member, a gear provided on said carrying member and a pinion for coöperating therewith, supported by the clamping member, said pinion having an axial movement to accommodate itself to the radial movement of the carrying member, and automatic means for feeding the cutter-rollers into the material as the carrier member is rotated.

13. In a cutting device, the combination of a clamping member, a cutter-carrying member having rotative engagement therewith, said engagement being such as to prevent independent axial movement and permit independent radial movement between said two members, cutter-rollers slidably mounted in said carrying member, and star-wheel-controlled screws in said carrying member and a lug on said clamping member to coöperate therewith, as automatic means for feeding the cutter-rollers into the material as the carrying member is rotated.

14. In a cutting device, the combination of a clamping member, a cutter-carrying member having rotative engagement therewith, said engagement being such as to prevent independent axial movement and permit independent radial movement between said two members, cutter-rollers slidably mounted in said carrying member, a gear provided on said carrying member, a pinion for coöperating therewith supported by the clamping member, and star-wheel-controlled screws in said carrying member and a lug on said clamping member to coöperate therewith, as automatic means for feeding the cutter-rollers into the material as the carrying member is rotated.

ROBT. A. JACKSON.

Witnesses:
W. J. SINSFUFF,
H. C. CRAWFORD.